C. B. DEEDS.
COLLAPSIBLE TIRE RIM.
APPLICATION FILED JUNE 2, 1919.
1,358,711.
Patented Nov. 16, 1920.
2 SHEETS—SHEET 1.
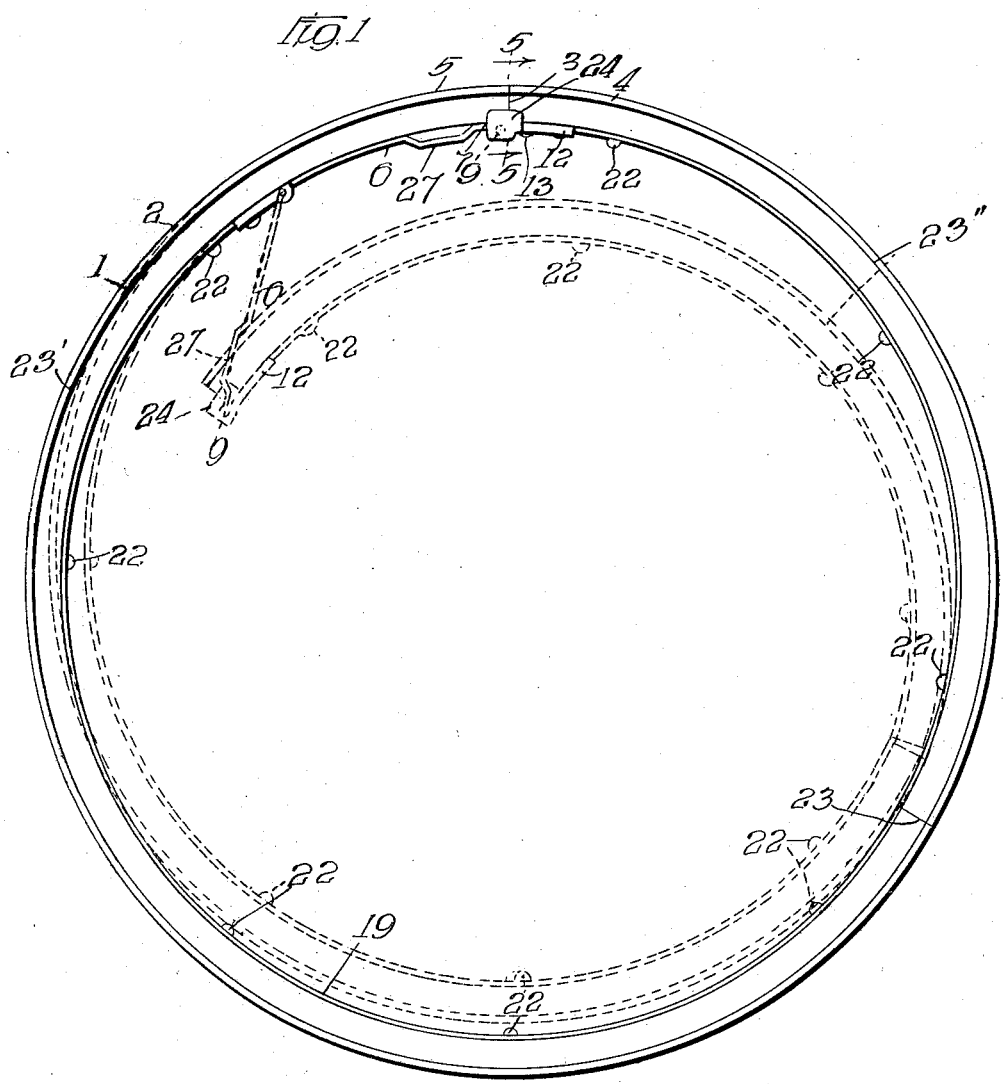
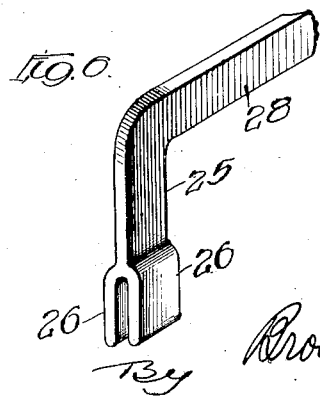
Witnesses:
Harry R. White
W. P. Kilroy
Inventor:
Charles B. Deeds
By Brown, Boettcher & Diemer
Attys C. B. DEEDS.
COLLAPSIBLE TIRE RIM.
APPLICATION FILED JUNE 2, 1919.
1,358,711.
Patented Nov. 16, 1920.
2 SHEETS—SHEET 2.
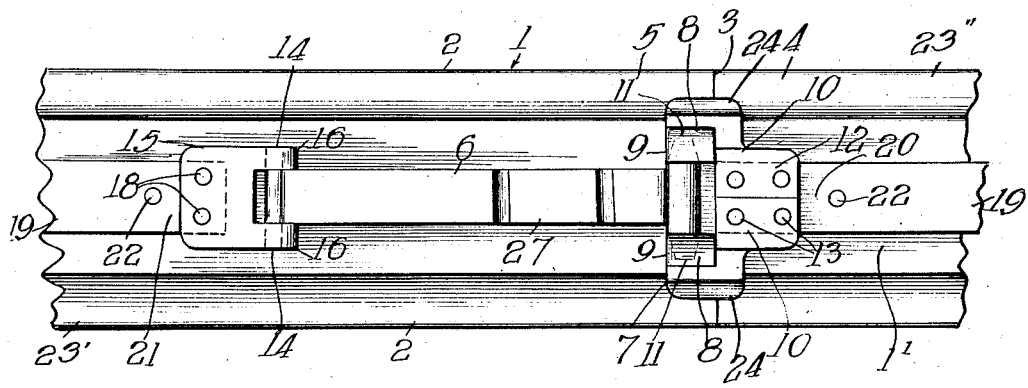
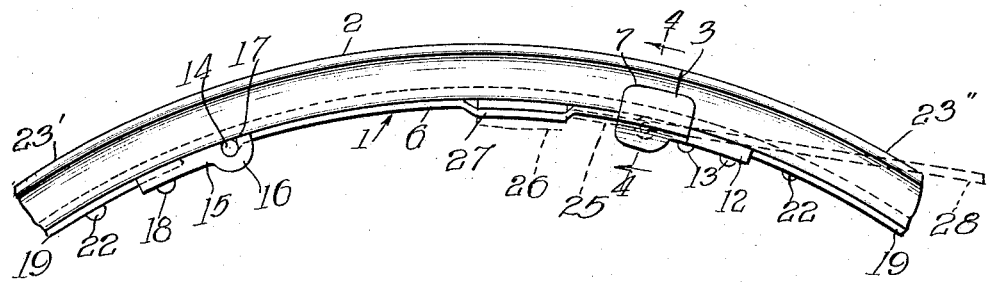
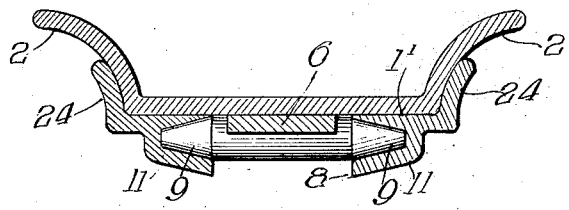
Witnesses
Harry P. L. White
W. T. Kilroy
Inventor
Charles B. Deeds
By Brown, Boettcher & Riemer
Attys

UNITED STATES PATENT OFFICE.

CHARLES B. DEEDS, OF SAVANNA, ILLINOIS.

COLLAPSIBLE TIRE-RIM.

1,358,711. Specification of Letters Patent. Patented Nov. 16, 1920.

Application filed June 2, 1919. Serial No. 301,207.

*To all whom it may concern:*

Be it known that I, CHARLES B. DEEDS, a citizen of the United States, residing at Savanna, in the county of Carroll and State of Illinois, have invented a certain new and useful Improvement in Collapsible Tire-Rims, of which the following is a full, clear, concise, and exact description, reference being had to the accompanying drawings, forming a part of this specification.

My invention relates to an improvement in rims which serve as carriers for tires, having inexpansible bases or base beads, and the invention has for its object the provision of means whereby the rim may be collapsed within its normal circumference to a sufficient extent to permit its insertion into and its removal from such tires.

Another object of my invention is to provide simple attachments for readily and easily converting a solid or uncut rim or one cut at only one point in its circumference, into a rim which has a part which can be readily swung within its circumference and which is adapted to assist in forcibly collapsing or distorting the rim to a smaller than normal curvature for the purpose of causing it to become small enough to be easily entered into or removed from a tire.

The invention consists in a flanged tire rim cut apart at at least one point in its circumference and provided with a link adapted to lie within the periphery of the rim and pivotally connected to one end of the rim adjacent the cut and pivotally connected at its other end to the opposite end of the rim at a point both from the cut and adapted to swing the first end of the rim within the circumference of the rim when the rim is collapsed and a resilient ring extending around the rim from one pivotal connection to the other, secured at intervals to the rim and adapted to cause the rim to resume its true normal shape when the rim is expanded after being collapsed.

The invention further consists in means for use with a rim which is out at one point in its circumference, which can be attached to the rim by a few rivets through the web thereof, and which will convert the rim from one having two ends unattached to a rim having its two ends linked together and collapsible for insertion into and removal from a tire.

The invention will be more readily understood by reference to said accompanying drawings in which:

Figure 1 is a side elevation of a collapsible rim made in accordance with my invention;

Fig. 2 is a fragmentary inner plan view of the rim particularly illustrating the link connection;

Fig. 3 is a fragmentary side elevation of the rim showing the link connection;

Fig. 4 is a transverse section of the rim substantially on the line 4—4 of Fig. 1;

Fig. 5 is a transverse section of the rim substantially on the line 5—5 of Fig. 3; and Fig. 6 is a perspective view of a tool for collapsing and expanding the rim.

In accordance with my invention I provide a circumferential tire carrying rim 1 having at each side a circumferential flange 2. These flanges are adapted to engage the base beads of the tire for which the rim is a conveyer, and hold the tire on the rim, and obviously the flanges can be of the "Dunlop" type shown in the drawings, or the common inturned clencher type.

The tires which are mounted upon the rims of this character usually have inexpansible base beads or bases and consequently some means of changing the size or diameter of the rim must be provided to facilitate the mounting and dismounting of the tire. Furthermore rims of this character are frequently made of light thin metal that lacks sufficient resiliency or rigidity to remain true when collapsed and expanded many times.

In order to be able to collapse the rim to a diameter so that its flanges can readily pass through a tire, I cut the rim transversely at one point 3 in its circumference, and I join the two ends 4 and 5 of the rim thus produced with a link connection of peculiar construction and by means of which the end 4 of the rim can readily be swung within the end 5 as shown in the dotted lines, Fig. 1, in which condition the rim as a whole is small enough to pass readily through a tire adapted to be seated on the rim. This link connection consists of a link 6 adapted to lie against the inner periphery of the rim and pivotally connected at one end 7 to the end 4 of the rim and adjacent to the cut 3 in the rim and pivotally connected at its other end to the opposite end of the rim.

For the purpose of connecting the end 7 of the link to the end 4 of the rim to permit the end 4 of the rim to swing to the collapsed condition shown in Fig. 1 in dotted lines, I provide the link with transversely extending alined pivot bearings 8 adapted to fit within sockets 9 provided within connecting members 10 carried by the end 4 of the rim. The sockets 9 are formed in parts 11 of the connection 10, which are arranged to project beyond the cut 3 and I preferably form the sockets cone shaped and the pivot pins 9 likewise coned to fit in the sockets. This connection formed of the parts 10 is thus provided with a central slot extending beyond the end 4 of the rim for receiving the end 7 of the link and permitting the link to swing part of the end 4 of the rim when the rim is collapsed. Each connection 10 is provided with a rearwardly extending flat connecting pad 12 adapted to be secured to the web 1', of the rim by rivets 13.

The two parts 10 of the connection with the coned sockets 9 can be readily assembled upon the links and when once assembled and secured to the rim the link is permanently connected with the rim.

At the other end the link is provided with transversely extending alined pivot projections 14 adapted to be engaged by a connection clip 15. The clip is provided with forwardly extending projections 16 and having U shaped sockets 17 to receive the projections 14, the clips being rigidly secured to the web of the rim by the rivets 18. This form of clip and link are readily assembled and when the clip is riveted to the rim the pivoted projections 14 cannot escape from the sockets 17.

In many rims the link connection as described and the single cut 3 is sufficient to permit the collapse and cause the expansion of the rim, but in many instances the rim is either too rigid to permit its collapse or not having sufficient resiliency does not readily come back to its true circular condition once having been collapsed. To remedy this I provide a resilient ring or strap 19 which extends around the rim and contacts with its inner periphery and preferably made of spring steel or other similar material. One end 20 of this strap projects beneath the part 10 of the connection for the link 6 and is rigidly secured to the rim and the connections 10 by the rivets 13, and the opposite end 21 of the strap is likewise connected to the rim and the connection 15 by the rivets 18. Each of these connections is provided with a gain or groove to receive the end of the strap. I also connect the strap to the web of the rim at several other points in its circumference by rivets 22.

For the purpose of permitting the easy collapse of some rims which are particularly rigid I cut the rim transversely at a second point 23 of its circumference, this dividing the rim into two sections, 24 and 25, one of which, 24, is considerably shorter than the other. The shorter section 24 is the one to which the end 7 of the link 6 is pivotally connected, so that in collapsing and expanding the rim the link and the shorter section act as a toggle lever in forcing the rim either to a collapsed condition or to an expanded condition, as the first tendency of the action of the links in collapsing the rim is to slightly expand the rim until the pivots 8 pass the line joining the pivots 14 and the cut 23 in the rim.

Two of the rivets 22 are spaced apart on opposite sides of the cut 23 to permit said cut to open up as the rim is collapsed the straps 19, where it spans said cut, acting in the nature of a hinge or yielding connection permitting the collapse of the rim.

To accurately dowel and hold the two ends 4 and 5 of the rim, in addition to the pivotal connections described, I provide outwardly extending ears or lugs 24 on the connections 10 adapted to span the cut 3 in the rim and to contact with the flanges 2 of the rim as shown in Fig. 5. As the rim is expanded the end 5 of the rim is seated firmly between the lugs 24 which are carried by the end 4 of the rim and is caused thereby to be accurately alined with the end 4.

In order to facilitate the collapse of the rim I provide a tool 25 having a pair of spaced parallel jaws 26 adapted to straddle the link 7, between its ends, and which I provide with an inwardly offset portion 27 to permit the jaws 26 to be placed upon the link. The handle 28 of the tool 25 is bent off at right angles and in the plane of the jaws 26 so that when the tool is placed upon the link as illustrated in dotted line (Fig. 3), the handle extends in substantial alinement with the link and provides a powerful lever or wrench by which the link can be forcibly swung on its pivots 14 either to collapse or expand the rim.

It should be noticed that in converting a non-collapsible rim into a collapsible rim in accordance with my invention it is merely necessary to make the cut 3 or the two cuts 3 and 23, as may be, and to attach the connecting links. It will now be apparent that a collapsible rim can be provided with a minimum expenditure for both labor and material.

As it is obvious that many modifications of my invention will be readily suggested to one skilled in the art, I do not desire to confine or limit my invention to the specific structures herein shown and described.

I claim:

1. In a rim of the kind described, the rim being cut apart transversely at one point in its circumference, a link adapted to contact with the inner periphery of the rim and having coned bearings at one end, a divided pivotal connection for placement on said coned bearings and adapted to be secured to the inner periphery of the rim with said opposed bearings arranged beyond the end of the rim, the opposite end of the link pivotally connected to the opposite end of the rim at a distance from said cut.

2. In a device of the kind described, a flanged tire rim cut apart at two points in the circumference, forming two sections, one constituting about one third of the circumference of the rim, a resilient flat strap secured to the inner periphery of the rim spanning one cut and ending at one end adjacent to the free end of the shorter section, and at the opposite end at a distance from the adjacent end of the longer section, and a link pivotally connecting the two ends of the strap and rim and adapted to be swung on one pivoted end to swing the connected end of the shorter section within the circumference of the rim.

3. In a device of the kind described, an attachment for converting a split rim into a collapsible rim, comprising a resilient strap adapted to be arranged within the periphery of the rim, a link, which together with the strap makes up a complete circle attachment, adapted to be secured to the ends of the strap and to pivotally connect the ends of the link to the ends of the strap, the whole adapted to be secured to the inner periphery of a flanged tire rim cut at one point in its circumference and with the link arranged with one end adjacent to the cut in the rim but arranged beyond the end of the rim to which it is attached, the projecting connection being slotted to permit the link to turn freely and the opposite end of the link pivotally connected at a distance from the cut.

4. In a rim of the kind described, provided with circumferential flanges at its edges and cut apart at one point in its circumference, a link adapted to join the ends of the rim and lie in substantial contact with the inner periphery of the rim, one end of the link provided with coned, alined pivots, a divided connection for placement on the pivots and adapted to be connected to one end of the rim for pivotally connecting the link to said end of the rim, said connections having laterally and outwardly extending lugs at their edges adapted to span the cut in the rim and to dowel the two ends of the rim together when the rim is in tire carrying condition.

In witness whereof, I hereunto subscribe my name this 28th day of May, A. D. 1919.

CHARLES B. DEEDS.